United States Patent Office 3,317,919
Patented May 2, 1967

3,317,919
CATALYTIC POLYMERIZATION OF ETHYLENE SULFIDE
Manfred Sander, Frankfurt am Main, Germany, assignor, by mesne assignments, to Mobil Oil Corporation, a corporation of New York
No Drawing. Filed Dec. 14, 1962, Ser. No. 244,589
10 Claims. (Cl. 260—79)

The present invention relates to novel methods for the catalytic polymerization of ethylene sulfide and, more particularly, to the formation of polymers of ethylene sulfide of relatively high molecular weight and crystallinity.

As those skilled in the art may be aware, known polymeric ethylene sulfides are characterized by having a high resistance to conventional solvents. Though they possess a comparatively high melting point, their utility for industrial applications as plastic materials is seriously limited due to their lack of adequate mechanical strength that stems from their comparatively low molecular weight of, for example, about 1000 to 2000.

Thus, polymers of ethylene sulfide have been prepared by reaction of ethylene chloride or bromide with sodium sulfide or potassium sulfide and which polymers contain terminal halogen groups, melt below 165° C. and decompose quantitatively above 10° C. to dithietane and undefined oils. Similar polymers have been prepared by reaction of 2,2-dichlorodiethyl sulfide with potassium sulfide or by interaction of disodium-ethylene dithiolate and ethylene bromide. Treatment of monothioethylene glycol with sulfuric acid has produced polymers that melt between 177 and 180° C. and 193 to 197° C. Still further, polymers have been produced by heating 2,2-dichlorodiethyl sulfide with sodium and which polymers melt between 158 and 160° C. Such polymers depolymerize upon further heating and, from cryoscopic determinations, all of such polymers have molecular weights below 2000.

It is also known that ethylene sulfide, upon extended storing, slowly polymerizes in the absence of a catalyst to form a white mass having the composition $(C_2H_4S)_n$ and melting in the range of about 140 to 150° C., and that the rate of such polymerization can be increased by use of acids, ammonia or caustic soda solution. However, such products have an exceptionally low molecular weight of up to $n=12$. By use of ammonia or amines, polymers of molecular weights of about 400 to 1000 have been obtained; use of NaOH in methanol, polymers melting between 182 and 185° C. have been obtained; and, with NaOH, $C_2H_5ONa$ or amines, there has been prepared polymers melting below 180° C. and having molecular weights below 1000. Not only has ethylene sulfide not produced high molecular weight polymers by such methods, but the melting point characteristics of the polymers indicates presence of polymers of lower molecular weight and high dispersity with a comparatively high content of terminal groups.

In accordance with this invention, it has been found that ethylene sulfide can be polymerized to relatively high molecular weight polymers by initiating the polymerization reaction with a catalyst that is a metal from the group consisting of alkali metals and alkaline earth metals. Generally speaking, the polymerization reaction is carried out with use of the catalyst in an amount that does not exceed about one percent, based on the weight of the monomer to be polymerized and, preferably, with a concentration of catalyst of from about 0.1 to about 0.001% although the polymerization can be carried out with amounts of catalyst even below 0.001%. For such polymerization of ethylene sulfide, the molecular weight of the polymers generally increases as the concentration of the catalyst is decreased and, thus, to a certain extent, the melting point also increases as the concentration of the catalyst is decreased. Moreover, it has been found that, in general, the melting point does not substantially, if at all, increase above 210 to 212° C. even if the molecular weight exceeds above about $\eta_{red}=0.3$.

In further reference to the process embodied herein, it has been found that the rate of polymerization generally increases with an increase in concentration of the catalyst although, apart from catalyst concentration, the yield of polymer per unit time also depends on the reaction temperature employed and dilution of the ethylene sulfide monomer generally reduces the reaction rate. Nevertheless, it is desirable to carry out the polymerization reaction in the presence of an inert liquid reaction medium, examples of which include hydrocarbons and ethers, such as aliphatic hydrocarbons (e.g., petroleum ethers), aromatic hydrocarbons (e.g., alkyl aromatics such as toluene), aliphatic ethers (e.g., diethyl ether), etc., as the use of such liquid reaction mediums result in a reaction that is smoother with production of a more finely divided (e.g., powdered) polymer that can be more readily handled for further processing. In the absence of such a liquid reaction medium, and particularly when an alkali metal catalyst is used, the polymerization reaction is more vigorous with production of a more massive polymer that is more difficult to handle for further processing.

Desirably, the polymerization reaction is carried out with use of the catalyst metal in finely divided or dispersed form as, for example, as powdered metal, granular metal, metal chips, metallic films on carriers, etc. The polymerization reaction can also be suitably carried out with the catalyst metal dissolved in suitable solvents, for example, a solution of sodium in liquid ammonia. In further reference to the catalysts embodied herein, the activity of the metal catalysts within one group (that is, the alkali metal or alkaline earth metal groups) increases with increase of atomic weight of the metal. Alkali metals have a much higher activity than alkaline earth metals. Thus, rubidium, cesium and potassium initiate the polymerization of highly diluted solutions of ethylene sulfide even at room temperature or lower temperatures whereas initiation by sodium and lithium requires larger quantities of catalyst, or higher concentrations of ethylene sulfide, or higher temperatures. Barium and strontium have a much lower activity than sodium, whereas the initiation by calcium and magnesium is more successful at elevated temperatures in the absence of solvents. Of the catalysts suitable for practice of this invention, sodium is the preferred catalyst as it has a satisfactory activity and can readily be finely divided. Depending on the activity and quantity of the catalyst used and the concentration of the monomer in the solvent, the polymerization can be effected at room temperature or at temperatures below or above room temperature. The total quantity of catalyst and ethylene sulfide can be mixed and caused to polymerize by heating or, alternatively, the main proportion of monomer is added to the reaction mixture during the polymerization, or both catalyst and monomer are added continuously. If elevated temperatures are applied, it is advisable to run the reaction in a sealed vessel into which ethylene sulfide is admitted in quantities corresponding to the consumption of this substance as indicated by a drop in pressure. All of these procedures involve techniques customary with other polymerization reactions and thus are within the skill of art.

In the process embodied herein, the reaction ceases as soon as the monomer is used up, or the reaction is interrupted by the addition of aqueous acids. The polymerization takes place in the solid state, since the polymer is insoluble in solvents and in the ethylene sulfide monomer. After the reaction is completed, the resultant polymer suspension is treated with ethanol or other alcohol to decompose residual metal that may be present. The polymer is then filtered and washed with a mineral acid to eliminate any chemically bound metal as polymers that may contain metal bonded to the terminal groups have a lower thermal stability and inferior processing properties. The acid is then removed by washing with water and residual traces of solvent can be removed by washing with a substance such as acetone or methanol and subsequently dried.

The polymers embodied herein, and produced by the process aforedescribed, possess high crystallinity, as evidenced by their having a comparatively sharp melting point of at least 205° C. and, more specifically, about 210° C. Depending on the method by which the melting point is determined, melting points ranging between 205 and 212° C. have been determined, and all poly(ethylene sulfide) polymerized in the presence of alkali metal or alkaline earth metal as embodied herein have possessed melting points within this range. The high crystallinity is not only evidenced by the sharp melting point but also by observation of the solidified melts under the polarizing microscope as well as by X-ray diffraction patterns. On account of this high crystallinity, the polymer is not soluble in any known solvent below a temperature of 150° C. Only above temperatures of 160° C. does it dissolve in high-boiling polar solvents, such as dimethyl sulfoxide, tetramethylene sulfone, nitrobenzene, phenol, etc. In this way it is possible to determine the viscosity of the solution at 170° C. or higher temperatures. The obtained values of the reduced viscosity at 175° C. in dimethyl sulfoxide ranged between 0.2 and 0.5 indicating molecular weights of approximately 10,000 to 50,000.

The linear structure of the polymer embodied herein is evidenced by its thermal plasticity and solubility. The stability of the polymer is conspicuously high as compared with other poly(ethylene sulfides) of which I am aware. No loss in weight was observed after heating the polymer for three hours at 200° C. and a melt of the polymer remains undecomposed upon extended exposure to temperatures up to 220° C. Only at temperatures above 250° C. is decomposition observed which is accompanied by the formation of gaseous and oily products. The polymer is resistant to nonoxidizing acids; for example, it is not affected by boiling concentrated hydrochloric acid, and oxidizing acids do not entail decomposition at moderate temperatures. Up to temperatures of 150° C. the polymer is not affected by alkaline solutions and extended storing in air does not lead to a noticeable change in the moleuular weight or mechanical strength.

In order to further describe the invention, the following embodiments are set forth for purposes of illustration and not limitation.

*Example 1*

A suspension of 0.06 gram powdered sodium in 0.6 ml. toluene was mixed in a glass tube with 50 ml. diethylether and 20 grams ethylene sulfide and the air was replaced by nitrogen. After sealing the tube by fusing, it was rocked for 24 hours at room temperature. The resultant precipitate was filtered off, washed with ethanol, boiled for 30 minutes with 10 percent hydrochloric acid, filtered, washed with water and acetone and dried in a desiccator. 12.5 grams of a colorless powder was obtained which melted between 209 and 211° C. (observation under a hot stage microscope).

In determining the viscosity of the solution, a capillary viscosimeter was filled with 3 ml. dimethyl sulfoxide and the viscosimeter heated in a thermostat to 175° C. (±0.1° C.). 30 mg. of the polymer was fed into the hot viscosimeter by means of a small funnel. As soon as the substance had dissolved, the flow time was measured repeatedly in the conventional manner. The first two measurements were not used in calculation of mean values. The polymer had a relative viscosity at 175° C. of 1.33; i.e., equivalent to a reduced viscosity $$\eta_{red}^{175} \text{ of } 0.33$$

The same run at 50° C. gave a polymer of M.P. 207 to 210° C. and $$\eta_{red}^{175} \text{ of } 0.27$$

in a yield of 100 percent.

*Example 2*

In a three-necked flask equipped with stirrer, reflux condenser and gas inlet tube 2 ml. of a 10 percent dispersion of sodium in toluene was mixed with 50 ml. diethyl ether and 20 grams ethylene sulfide and stirred under nitrogen for 48 hours at room temperature. Subsequently, 5 ml. ethanol was added and the powdered polymer filtered, washed in 10 percent hydrochloric acid and then with water, boiled for 15 minutes with acetone, filtered and dried.

The reaction produced 17.2 grams polymer of M.P. 207 to 209° C. and a reduced viscosity in dimethyl sulfoxide $$\eta_{red}^{175} \text{ of } 0.25$$

The same run with 0.015 gram sodium gave 9 grams polymer of M.P. 210 to 211° C. and $$\eta_{red}^{175} \text{ of } 0.36$$

The same run without any catalyst gave 1.4 grams polymer of M.P. 155 to 196° C. and $$\eta_{red}^{175} \text{ of } 0.06$$

*Example 3*

In the apparatus described in the preceding example, 0.33 gram of finely divided potassium suspended in 50 ml. toluene was mixed with 50 grams ethylene sulfide at −30° C. With stirring under nitrogen the temperature was raised to 20° C. Polymerization occurred rapidly at this temperature and a slight turbidity of the solution occurred. After stirring for 20 hours at room temperature, the polymer was worked up as described in Example 2.

Yield: 42 grams, M.P. 210 to 211° C., $$\eta_{red}^{175} \ 0.46$$

*Example 4*

To a suspension of 0.07 gram rubidium (coarse chips) in petroleum ether was added a solution of 5 grams ethylene sulfide in 20 ml. diethyl ether at room temperature. Mild polymerization set in instantaneously. The color of the polymer changed within 10 hours from gray to yellowish-white. After 15 hours, the mixture was treated as described in Example 2.

Yield: 4.6 grams, M.P. 205 to 208° C., $$\eta_{red}^{175} \ 0.18$$

The same run with 0.05 gram cesium chips instead of rubidium yielded, after 10 hours at 22° C., 4.6 grams poly(ethylene sulfide) with a melting point of 207 to 209° C. and a reduced viscosity (at 175° C.) of 0.25.

The polymer embodied herein can be processed to the desired shapes by methods generally used for thermoplastic materials, for example, by compression molding, extrusion molding, or injection molding. Fillers, pigments, coloring matter or other additives can be admixed with the polymer. Also, the polymer can be mixed with other polymeric substances; for example, it is readily miscible with polyethylene and other polyolefins to provide polyblends that advantageously can be prepared during molding. It is preferable to use a melt for the processing of the polymer to film or fibers by conventional methods, since the production of films or fibers from solutions is intricate and requires expenesive solvents.

As aforesaid, the polymers embodied herein possess excellent resistance to chemical attack and, especially, against attack by acids such as hydrochloric acid and alkaline solutions.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for preparing crystalline poly(ethylene sulfide) having a molecular weight of at least 10,000 and a melting point of at least 205° C., which comprises polymerizing ethylene sulfide in the presence of a small amount, based on the weight of the ethylene sulfide and sufficient to catalyze the polymerization of said ethylene sulfide, of a metal selected from the group consisting of alkali metals and alkaline earth metals.

2. A process according to claim 1 which comprises polymerizing ethylene sulfide in the presence of a metal selected from the group consisting of alkali metals and alkaline earth metals in an amount of not more than about one percent based on the weight of ethylene sulfide.

3. A process according to claim 1 in which the metal is in finely dispersed form.

4. A process, as defined in claim 1, in which the catalyst is sodium.

5. A process, as defined in claim 1, in which the metal is potassium.

6. A process, as defined in claim 1, in which the polymerization of the ethylene sulfide is carried out under an inert atmosphere.

7. A process, as defined in claim 1 in which the polymerization is carried out in the presence of an inert liquid reaction medium.

8. A process, as defined in claim 7, in which the reaction medium is a liquid hydrocarbon.

9. A process as defined in claim 7 in which the reaction medium is diethyl ether.

10. A process for preparing crystalline poly(ethylene sulfide) having a molecular weight of at least 10,000 and a melting point of from about 205 to about 212° C. which comprises polymerizing ethylene sulfide under an inert atmosphere in the presence of from about 0.001 to about one percent, based on the weight of the ethylene sulfide, of a metal selected from the group of alkali metals and alkaline earth metals and in the presence of an inert liquid reaction medium.

References Cited by the Examiner

UNITED STATES PATENTS

| 2,183,860 | 12/1939 | Coltof | 260—79 |
| 3,071,593 | 1/1963 | Warner | 260—327 |
| 3,222,326 | 12/1965 | Brodoway | 260—79 |

OTHER REFERENCES

Tarbell et al.: Chemical Review, vol. 49 (1951), pages 18, 19, 83, and 84, American Chemical Society.

Miles et al.: "Dithiols, Part XII. The Alkaline Hydrolysis of Acetylate Hydroxy Acids. A New Reaction for the Formation of Cyclic Sulphides," J. Chem. Soc. (London) 1952, pages 817–826; page 817 especially relied upon.

Ohta et al.: "Studies on Ethylene Sulfide I. Polymerization of Ethylene Sulfide," as reported in Chem. Abs., vol. 51, 1957, page 14668.

Boilean et al.: Macromolecular Chemistry High Polymers of Ethylene Sulfide, Comptes Rendue (Academic Des Sciences, Paris), Session of April 9, 1962, vol. 254, pages 2774–6. Abstracted in Chemical Abstracts, vol. 57, 3621e (1962).

LEON J. BERCOVITZ, *Primary Examiner.*

J. R. LIBERMAN, *Examiner.*

M. I. MARQUIS, R. A. BURROUGHS, M. P. HENDRICKSON, *Assistant Examiners.*